United States Patent
Borkenhagen et al.

(10) Patent No.: US 7,013,375 B2
(45) Date of Patent: Mar. 14, 2006

(54) CONFIGURABLE DIRECTORY ALLOCATION

(75) Inventors: John Michael Borkenhagen, Rochester, MN (US); Philip Rogers Hillier, III, Rochester, MN (US); Russell Dean Hoover, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 10/403,157

(22) Filed: Mar. 31, 2003

(65) Prior Publication Data

US 2004/0193810 A1   Sep. 30, 2004

(51) Int. Cl.
*G06F 12/00* (2006.01)
(52) U.S. Cl. .................. 711/173; 711/129; 711/153
(58) Field of Classification Search .......... 711/173, 711/129, 153
See application file for complete search history.

(56) References Cited

U.S. PATENT DOCUMENTS 5,930,831 A * 7/1999 Marsh et al. ............... 711/173
6,662,272 B1 * 12/2003 Olarig et al. ............... 711/129

* cited by examiner

Primary Examiner—Matthew D. Anderson
(74) Attorney, Agent, or Firm—Robert R. Williams

(57) ABSTRACT

Methods, apparatus, and program product are disclosed for use in a computer system in which one or more multiprocessor nodes comprise the computer system. The methods and apparatus provide for configurable allocation of a memory in a node memory controller. In a single node implementation of the computer system, substantially all of the memory is allocated to a snoop directory used to store directory entries for cache lines used by processors in the node. In computer system implementations having more than one node, the amount of the memory allocated to the snoop directory and the amount of the memory allocated to a remote memory directory is controlled respondent to predetermined sizes respondent to the number of nodes in the computer system.

12 Claims, 7 Drawing Sheets

CONFIGURABLE DIRECTORY ALLOCATION

BACKGROUND OF THE INVENTION

1. Field of the Invention

The present invention generally relates to computers. More particularly, the present invention relates to computers that may have more than a single node, and where each node has more than a single processor.

2. Description of the Related Art

Early computer systems comprised a single processor, along with the processor's associated memory, input/output devices, and mass storage systems such as disk drives, optical storage, magnetic tape drives, and the like.

As demand for processing power increased beyond what was possible to build as a single processor computer, multiple processors were coupled together by one or more signal buses. A signal bus comprises one or more electrically conducting elements. For example a signal bus might simultaneously carry 64 bits of data from a first processor to a second processor. Many signal busses are logically subdivided and have an address bus portion, a control bus portion, and a data bus portion. Typically, signal buses in large computer systems further comprise parity or error correcting code (ECC) conductors to detect and/or correct errors that may occur during signal transmission.

Further demand for processing power forced computer designers to create computer systems having more than one node, where a node typically comprised more than one processor, each processor having several levels of cache dedicated to that processor. Each node would have a relatively large amount of memory. Computer systems designed to have from a single node to many nodes is also advantageous in that a customer can start with a small—perhaps a single-node—system, and purchase more nodes as the customer's need for processing power grows. Such computer systems are scalable, in that the power of the computer systems scales with the customer's need for processing power.

Such a computer system is shown in FIG. 1 and is generally designated as computer system 10. Computer system 10 is shown to comprise a node 18A and a node 18B which are coupled together by a bus 19. In general, more than two nodes can be coupled together, and bus 19 may be implemented as multiple busses, with the coupling to nodes being accomplished with well-known switching techniques. Node 18A and node 18B are shown to each have two processors, 11A and 11B. Processors 11A and 11B are shown to have L3 caches 12A and 12B, respectively. Modern processors typically have one or more levels of cache internal to the processor, and the L3 caches 12A and 12B are exemplary implementations of cache directly coupled to, or embedded within, a particular instance of a processor. Processors 11A and 11B are shown to be coupled together with a processor bus 15. Processor bus 15 is further coupled to a memory controller 13, which handles load and store commands issued by either processor 11A or processor 11B. In some systems, more than the two processors 11A and 11B are coupled together by processor bus 15; only two processors are shown for simplicity.

Since load and store commands are issued on processor bus 15 in processor nodes 18A and 18B, each processor in a particular node coupled to processor bus 15 in that node can "snoop" the address references of the load and store commands, checking and updating the state of cache lines owned by each processor. For example, (within a particular node) if processor 11A makes a reference to a cache line currently in L3 cache 12B, processor 11B will recognize the reference and will send the cache line over processor bus 15 to processor 11A, without need for passing the cache line into and subsequently from memory controller 13. Snoop cache techniques are well known in the computer industry.

A problem exists in transmitting a high volume of requests and data over processor bus 15. As shown, processor bus 15 is coupled to two processors (11A and 11B) and a memory controller (13). Bandwidth of data coming to or from the L4 memory 14, as well as requests for loads or stores, is shared by the two processors and this sharing of bandwidth limits processing throughput of the node and therefore the computer system. The problem is further aggravated by the required electrical topology of processor bus 15. For fastest data transmission, a very simple electrical configuration of a bus is implemented, ideally "point-to-point", in which the bus couples only two units, for example a single processor to a memory controller. As more couplings are added, the bus gets physically longer, and discontinuities of the physical connections introduce reflections on the bus, forcing a longer time period for each transmission of data. Therefore, the structure of processor bus 15 is a performance limiter.

A solution to this problem is shown in FIG. 1B, wherein separate processor busses 15A and 15B are shown to couple processor 11A and 11B, respectively to memory controller 13A. While this technique provides two busses and simplifies the electrical topology of the interconnect, processors 11A and 11B can no longer directly "snoop" the load and store requests of the other processor (or processors) in the particular node. Memory controller 13A could drive each load and store request seen on processor bus 15A onto processor bus 15B, and drive each load and store request seen on processor bus 15B onto processor bus 15A, but such a technique would be extremely wasteful and negate most of the advantages expected from providing a separate bus to each processor. To eliminate the need to drive each processor's load and store requests to the other processor, a snoop directory 26 is typically designed as a fixed portion of a directory memory 22 inside of, or coupled to, memory controller 13A. Snoop directory 26 contains directory entries about cache lines used by any processor in the node. Memory controller 13A uses snoop directory 26 to filter load and store requests from each processor so that only those load and store requests that the other processor must be aware of, or respond to, are forwarded to the other processor.

Each node must also retain directory entries for cache lines that have been sent to other nodes in the computer system. This information is stored in a remote memory directory 27 in a portion of directory memory 22 that is not allocated to snoop directory 26. In present computer systems, the allocation of directory memory 22 is fixed, regardless of the number of nodes in the computer system. When a computer system is configured having only one node, no remote memory directory is in fact required, causing the memory allocated to the remote memory directory to be wasted. When a large number of nodes are installed in the computer system, the fixed partition allocated for the remote memory directory may be smaller than optimal.

Therefore, a need exists to provide a better node directory management system for a computer system having more than one processor per node, the computer system being scalable in the number of nodes installed.

SUMMARY OF THE INVENTION

The present invention generally provides methods and apparatus to make better use of a directory memory in a memory controller in a node, having more than one processor, of a computer system. A node having more than one processor is also called a multiprocessor node. Unless otherwise stated, nodes in this invention mean multiprocessor nodes.

In an embodiment, a node of a computer system has a directory memory that can be logically partitioned into a snoop directory portion and a remote memory directory portion respondent to information about the number of nodes in the computer system.

In an embodiment, a system manager determines the number of nodes in the computer system and sets configuration information indicative of the number of nodes in the computer system in a memory controller in a node of the computer system. The memory controller allocates a first partition of the directory memory for a snoop directory and a second partition of the directory memory for a remote memory directory, the sizes of the first partition and the second partition are determined, at least in part, by the number of nodes in the computer system.

In an embodiment, the memory controller allocates substantially the entire directory memory to the snoop directory respondent to configuration information indicating that the computer system has only one node. The memory controller allocates a larger portion of the directory memory to the remote memory directory respondent to configuration information indicating a larger number of nodes exist in the computer system.

In an embodiment, a method is disclosed where the number of nodes in a computer system is determined and stored in a node. Respondent to this information, a directory memory in the node is partitioned into a snoop directory and a remote memory directory, the sizes of the snoop directory partition and the remote directory partition are determined, at least in part, by the number of nodes in the computer system.

In an embodiment, a program product is disclosed where the program product, executed on a suitable computer system, determines the number of nodes in the computer system and partitions a directory memory in a node between a snoop directory partition and a remote memory directory partition; the sizes of the snoop directory partition and the remote memory directory partition determined, at least in part, by the number of nodes in the computer system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Having reference now to the figures, and having provided above a discussion of the art, the present invention will be described in detail.

Figure 1A:
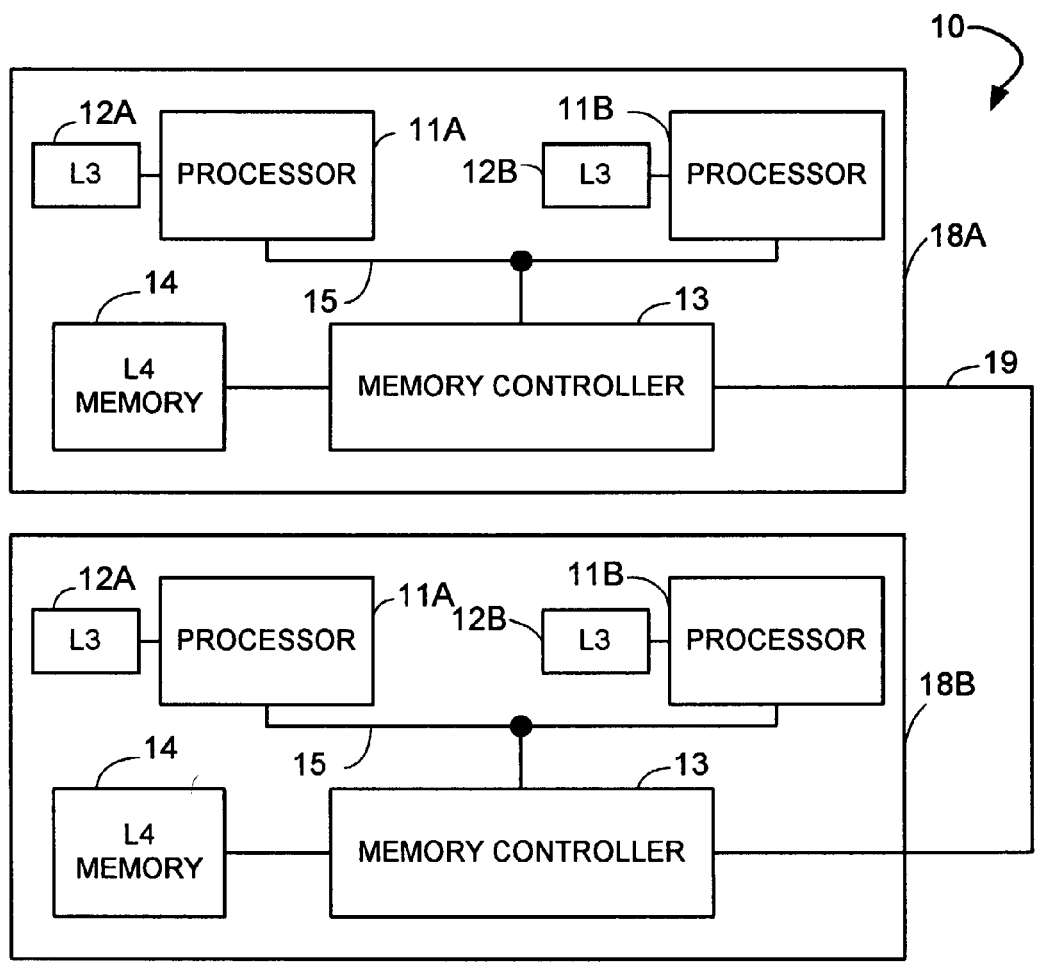
FIG. 1A is a prior art computer system having more than one node and having more than one processor per node, and in which the processors in each node share a bus coupled to a memory controller.
Figure 1B:
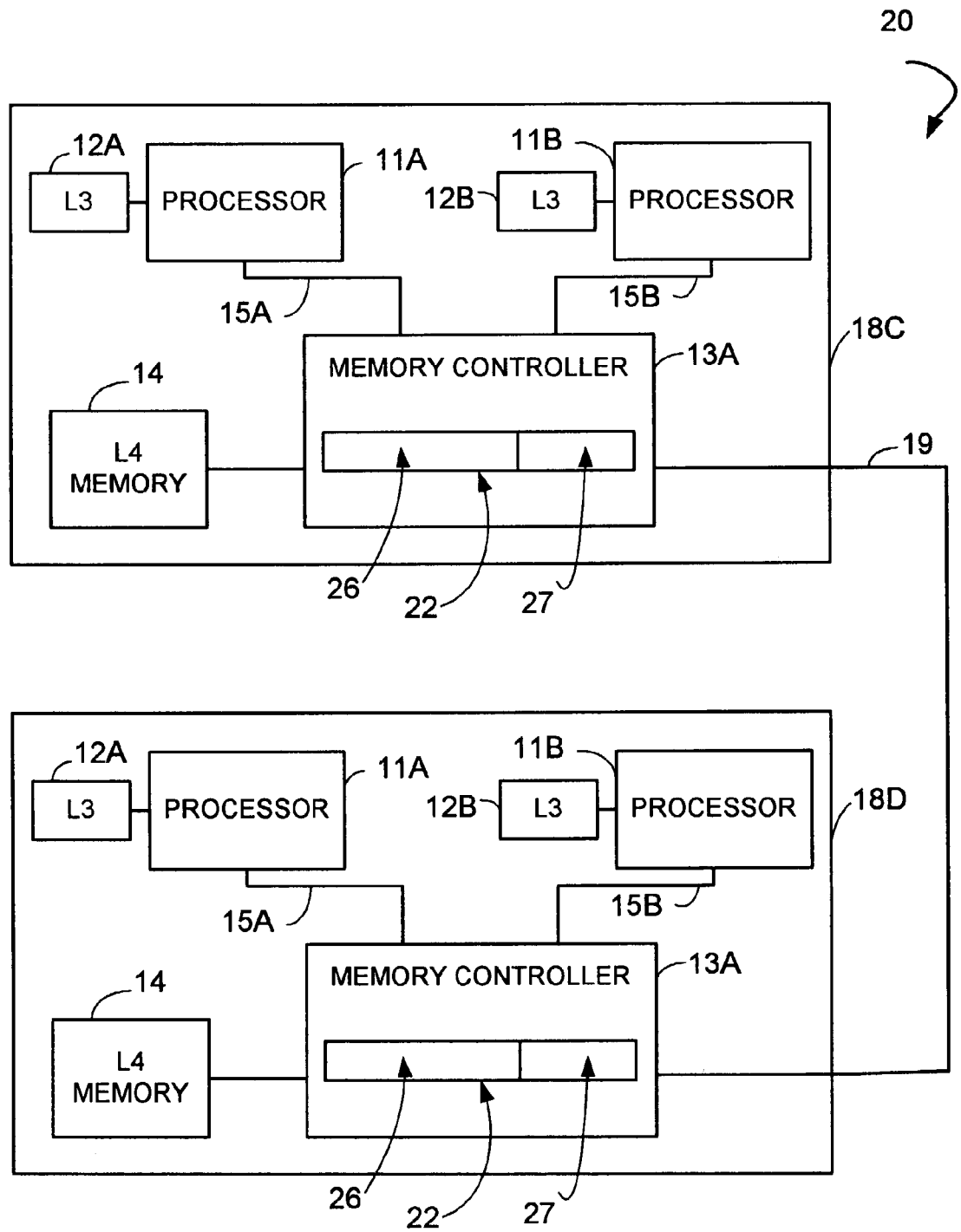
FIG. 1B is a prior art computer system having more than one node and having more than one processor per node, and in which there are more than one bus used to couple processors to the memory controller.
Figure 2:
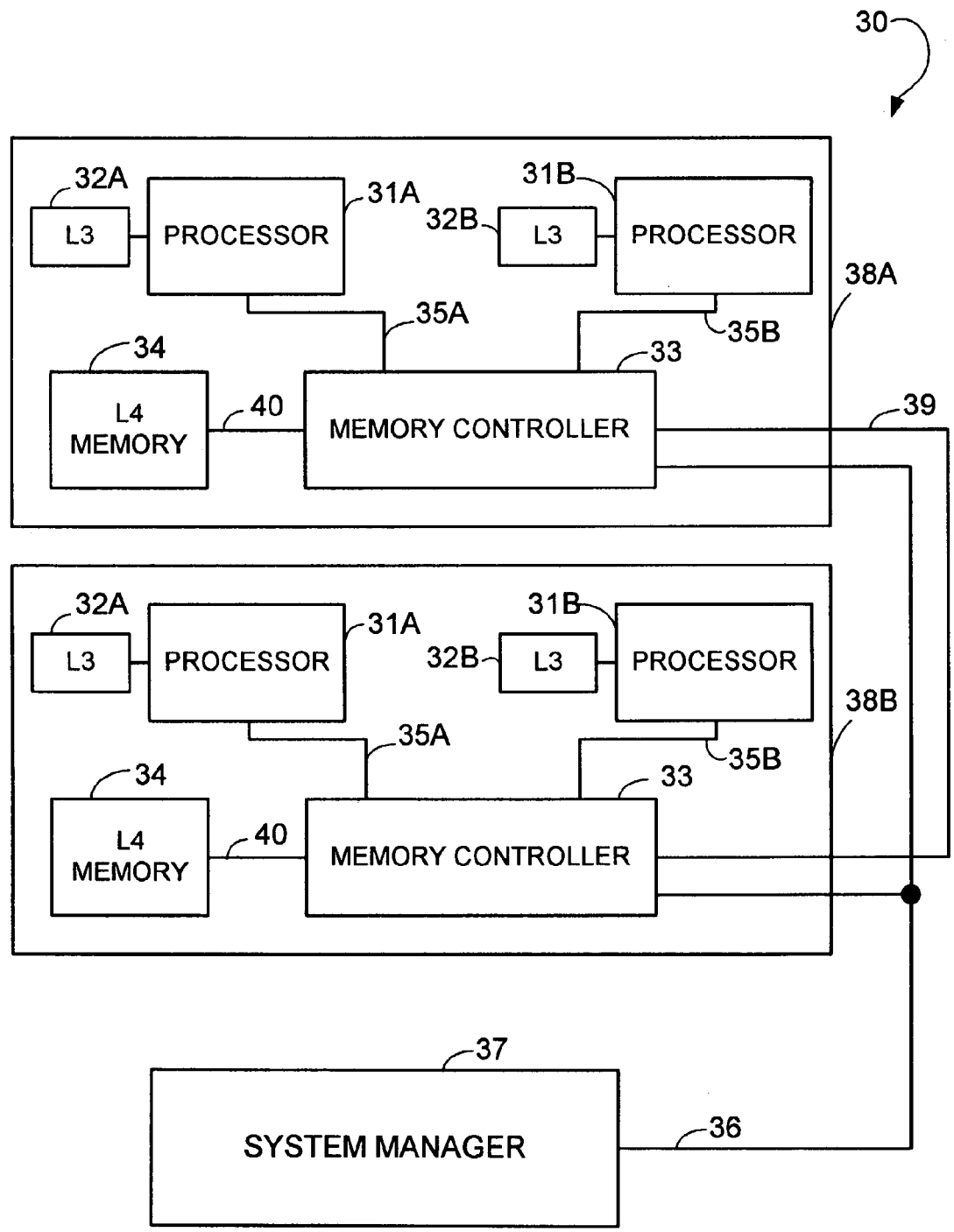
FIG. 2 shows a computer system as disclosed in the present invention, having two nodes for exemplary purposes, each node having a memory controller coupled to a system manager.

FIG. 2 shows a computer system generally referred to as 30. Computer system 30 comprises, as shown, two nodes, node 38A and node 38B. In general, computer system 30 can comprise any number of nodes, including only a single node. Computer system 30 may be shipped with only a single node installed, but have additional nodes installed at a later time. Computer node 38A and node 38B are installed in node sites (not shown) suitable to mechanically hold nodes, power nodes and interconnect signals to and from nodes. In an embodiment, such a node site is a socket on a Printed Wiring Board (PWB); in another embodiment such a node site is a connector on a motherboard into which a card comprising a node can be plugged. In yet another embodiment, such a node site is a Land Grid Array region on a PWB upon which a node can be installed. The invention contemplates any present or future node site upon which a node can be installed.

Like elements (e.g., Processor 31A) are labeled the same in each node for simplicity.

Nodes 38A and 38B each comprise more than one processor. Processors 31A and processor 31B are shown in each node; however node 38A (and node 38B) may comprise more than two processors coupled together on bus 35A and/or bus 35B (multiple processors coupled on busses 35A and 35B not illustrated). A single processor is shown coupled to bus 35A and to bus 35B for simplicity.

Processor 31A has at least one level of cache, and L3 32A is shown coupled to processor 31A. L3 32A could be a "level 3" cache, or any level of cache coupled to, or embedded within, processor 31A. Similarly, processor 31B is shown to have L3 cache 32B.

Processor 31A is coupled to memory controller 33 by bus 35A. Processor 31A sends requests for loads and stores to memory controller 33A over bus 35A, and receives or sends data associated with those requests over bus 35A. Although 31A is shown as a single processor coupled to bus 35A, more than a single processor could be coupled to bus 35A. As described earlier for a similar bus, if more than a single processor is coupled to bus 35A, the designer must consider the electrical topology complications in doing so, as well as the requirement for sharing the bus bandwidth of a bus between multiple processors. The present invention contemplates any number of busses from memory controller 33 to processors, each bus coupled to one or more processors.

Memory controller 33 is coupled by bus 40 to L4 memory 34. Memory 34 is a relatively large amount of memory, compared to the cache memory of a processor, e.g., L3 32A. L4 Memory 34 is designed to be large enough to satisfy many, if not most, of the memory requests of the processors in the node; processor 31A and processor 31B, in the exemplary FIG. 2. Memory 34 is addressed by an address space "owned" by the particular node.

Not all memory requests from a processor in a node in a multi-node system are typically satisfied by memory in that node. Some memory requests are in an address space "owned" by a different node in the computer system. For example, a request by processor 31A in node 38A might reference data held in L4 memory 34 in node 38B. Remote memory bus 39 couples memory controller 33 of node 38A with memory controller 33 of node 38B, and memory requests from node 38A to node 38B, or from node 38B to node 38A are satisfied by transmitting the associated requests and data over remote memory bus 39.

A system manager 37 is shown in FIG. 2. System manager 37 determines either by active query or has programmed within it the number of nodes in computer system 30 and transmits that information to the memory controller in each node over bus 36. For example, in the exemplary computer system 30, system manager 37 transmits, over bus 36, information indicative of the number of nodes in computer system 30 to memory controller 33 of node 38A and memory controller 33 of node 38B. A system manager 37 is a functional part of a computer system that is able to provide the number of nodes installed in the computer system. For example, in the IBM iSeries®, a "Service Processor" is capable of determining and supplying the number of nodes to a memory controller.

In an embodiment, a nonvolatile memory is programmed with the number of nodes and can be read in order to provide the number of nodes in the computer system to a memory controller. The nonvolatile memory can be any memory that does not lose information stored when power is removed or turned off from the computer system. For example, hard disks, floppy disks, CDROMS (compact disk read only memory), DVDs (digital versatile disc), EEPROMs (electrically erasable programmable read-only memory), Flash memories (sometimes called "flash RAMs"), DIP switches, MRAM (magnetoresistive random access memory), FeRAMs (ferroelectric random access memory), and electrical fuses are just some examples of nonvolatile memory. The present invention contemplates any current or future nonvolatile memory as being within the spirit and scope of the invention.

In an embodiment, bus 36 comprises a unique signal conductor for each node that may be in the computer system. For example, if a computer system can have 16 nodes, bus 36 would comprise 16 signal conductors. A first pull element, such as a relatively high-value resistance couples each signal conductor to a first power supply, advantageously ground, establishing the signal conductor at a first logical level in absence of an overcoming second pull component. When a node is installed, a second, stronger (overcoming) pull element, such as a relatively low-value resistance coupled to a second voltage supply on the installed node overcomes the first pull element and establishes the signal conductor at a second logical level. System manager 37, which may be separate as shown, or distributed or replicated logically among installed nodes, examines bus 36 and determines how many of the signal conductors described above are at the second logic level, and therefore determines how many nodes are installed in the computer system. Bus 36, as shown in FIG. 2 further comprises one or more additional signal conductors over which system manager 37 communicates information indicative of the number of nodes installed in computer system 30 to memory controller 33 in nodes 38A and 38B. As will be appreciated by those skilled in the art, if system manager 37 is replicated in each node, bus 36 does not require the one or more additional signal conductors described above used to communicate the information indicative of the number of nodes installed in computer system 30, since the system manager 37 function exists in each node.

An embodiment of system manager 37 polls each node that may be present in the computer system. Bus 36 is used in the exemplary computer system 30. System manager 37 determines the number of nodes present by responses to the polling. For example, if a poll is sent to a node with an address of 001, and that node is present, a signal in bus 36 is driven to a logical "high" level. If a poll is sent to a node with an address of 111, and that node is not present, a signal in bus 36 is not driven to a "high" level, and is held at a "low" level by a weak pull-down resistor, or other suitable pull element. Many techniques of polling for presence or absence of a functional unit in a computer system are known, and any means of determining the number of nodes is contemplated by the present invention. As will be appreciated by those of skill in the art, although system manager 37 is shown to be separate from any node, and is in fact physically separate from any node in some computer systems, system manager 37 may be physically placed in a particular node, or even be replicated on each node. For example each node present, in an embodiment, polls, using bus 36, or other bus, to find the number of nodes in the computer system.

Figure 3:
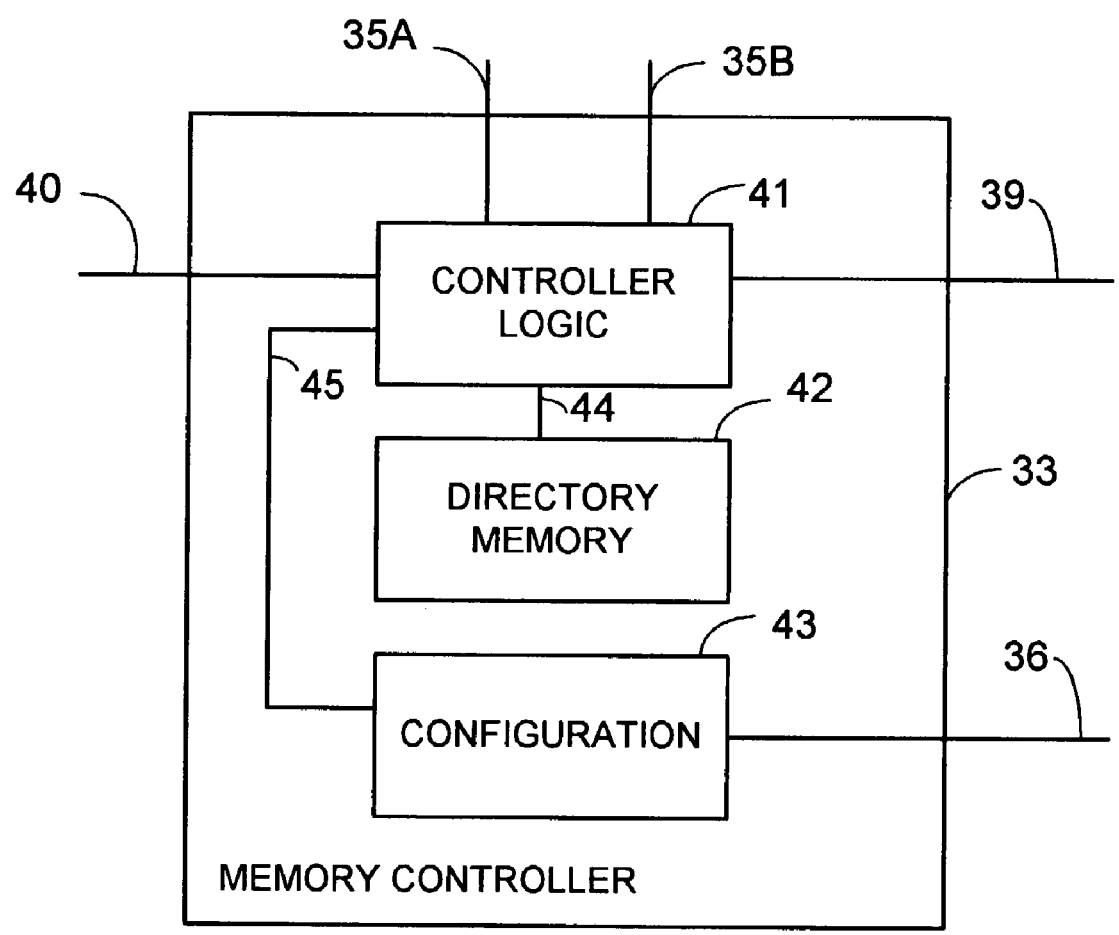
FIG. 3 shows a block diagram of the memory controller of the present invention.

FIG. 3 shows a block diagram of the major components of memory controller 33. Controller logic 41 handles interfacing to busses 35A and 35B, which were shown earlier to be coupled to processors 31A and 31B in the instant node.

Controller logic 41 handles interfacing to bus 40 which was shown earlier to be coupled to L4 memory 34 of the instant node. Controller logic 41 handles interfacing to remote memory bus 39 which was described earlier as used for transmission of memory requests and data between nodes.

Directory memory 42 in a particular node is used to store directory entries for cache lines currently used by processor caches of processors in the particular node. Such directory entries are kept in a snoop directory portion of directory memory 42, as will be described below. For example, memory controller 33 in node 38A contains directory entries for cache lines used by L3 32A in node 38A or L3 32B of node 38A. In addition, directory memory 42 in node 38A stores directory entries for cache lines from the address range of L4 memory 34 of node 38A that are sent to other nodes; node 38B in the exemplary FIG. 2. Such directory entries are kept in a remote memory directory portion of directory memory 42 as is described below. Controller logic 41 uses directory entries to maintain cache coherency, using techniques known in the art. As will be appreciated by those skilled in the art, controller logic 41 is typically designed to provide associativity, and modern controller logic designs sometimes provide programmable degrees of associativity to accommodate, for example, 2-way associativity, 4-way associativity, 8-way associativity, and so on. Those skilled in the art will appreciate that although directory memory 42 is shown in FIG. 3 as being contained within memory controller 43, directory memory 42 in an alternative embodiment is physically placed within the instant node, but physically placed outside memory controller 33 and is coupled to controller logic 41 by bus 44.

Configuration 43 receives and stores information sent by system manager 37 over bus 36 that is indicative of the number of nodes in computer system 30. Configuration 43 is further coupled to controller logic 41 so that controller logic 41 can allocate directory memory 42 into partitions as is described below. Those skilled in the art will appreciate that although configuration 43 is shown in FIG. 3 as being contained within memory controller 43, configuration 43 in an alternative embodiment is physically placed within the instant node, but physically placed outside memory controller 33 and is coupled to controller logic 41 by bus 45.

Figure 4A:
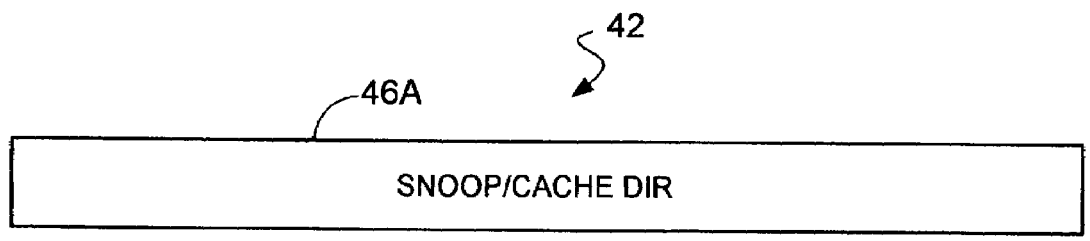
FIGS. 4A–4C show a directory memory used by the memory controller, in which the directory memory has several different partition allocations for a snoop directory and a remote memory directory.
Figure 4B:
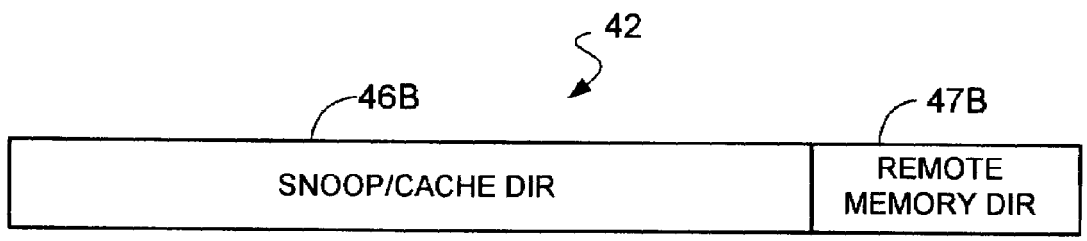
Figure 4C:
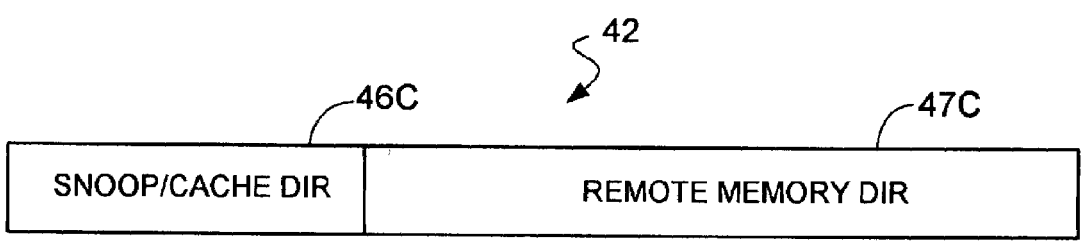

FIG. 4A–4C show how directory memory 42 in a node is partitioned differently respondent to information determined by system manager 37 about the number of nodes in computer system 30, and stored in configuration 43 in a node.

FIG. 4A shows how directory memory 42 is allocated if only a single node is determined to exist (i.e., installed) in computer system 30. All (or substantially all) of directory memory 42 is allocated to the snoop directory. A large snoop directory is desirable in order to hold as many snoop directory entries as possible. Since there are no other nodes, no cache lines can have been sent to other nodes, and no space need be allocated to a partition for a remote directory.

FIG. 4B shows how directory memory 42 is allocated if computer system 30 has a small number of nodes, such as, perhaps, two nodes. Since it is to be expected that most memory requests of a node will be satisfied by memory L4 of that node, and relatively few cache lines from the address space of that node will be requested by and therefore transferred to the second node, only a relatively small amount of storage is required for a remote memory directory partition 47B, and most of directory memory 42 can be allocated to snoop directory partition 46B.

If a large number of nodes exist in computer system 30, for example, 4 nodes, 8 nodes, or 16 nodes, it is expected that a large number of requests for data in the address space (L4 memory 34) of a particular node will have been made by other nodes, and the data will have been transmitted to those other nodes from the particular node. In that case, a large number of directory entries must be stored in a relatively large remote memory directory partition 47C, as shown in FIG. 4C. The corresponding snoop directory 46C becomes relatively smaller, as shown in FIG. 4C, which degrades processing throughout to some degree on the instant node because the number of snoop directory entry refills increases, but the tradeoff of allocating more remote memory directory entries (reducing the number of remote directory entry refills) versus fewer snoop directory entries enhances the overall throughput of computer system 30 when a large number of nodes exist.

While FIGS. 4A–4C and the above discussion show that directory memory should be allocated differently depending on the number of nodes in a system, with the remote memory directory being allocated a larger portion of directory memory 42 as additional nodes are added, the quantitative degree of allocation depends on a number of factors that varies from system to system and also upon the ability of the operating system of the computer system to manage and control locality of reference. For example, a particular operating system might do a good job of controlling locality of reference (high locality of reference), meaning that most of the memory references in a node are satisfied by memory addresses local to that node. In this case, remote memory directories in each node of a multi-node computer system 30 do not have to be relatively large. A second operating system might do a poor job of controlling locality of reference (low locality of reference), meaning that many—even most—of the memory references in a node are not satisfied by memory addresses local to that node. In this case, remote memory directories in each node of a multi-node computer system 30 would have to be relatively large. Table1 shows an exemplary allocation of a node's directory memory 42 into a snoop directory partition and a remote memory directory partition. "Snoop Dir %" and "Remote Dir %" are the percentages of directory memory 42 allocated to the snoop directory and to the remote memory directory, respectively. Operating system A has a higher locality of reference than operating system B in the exemplary table 1.

TABLE 1

| # Nodes | Operating System A | | Operating System B | |
|---|---|---|---|---|
| | Snoop Dir % | Remote Dir % | Snoop Dir % | Remote Dir % |
| 1 | 100 | 0 | 100 | 0 |
| 2 | 90 | 10 | 85 | 15 |
| 3 | 85 | 15 | 70 | 30 |
| 4 | 80 | 20 | 62 | 38 |
| 5 | 75 | 25 | 54 | 46 |
| 6 | 70 | 30 | 48 | 52 |
| 7 | 65 | 35 | 40 | 60 |
| 8 | 60 | 40 | 35 | 65 |

Figure 5:
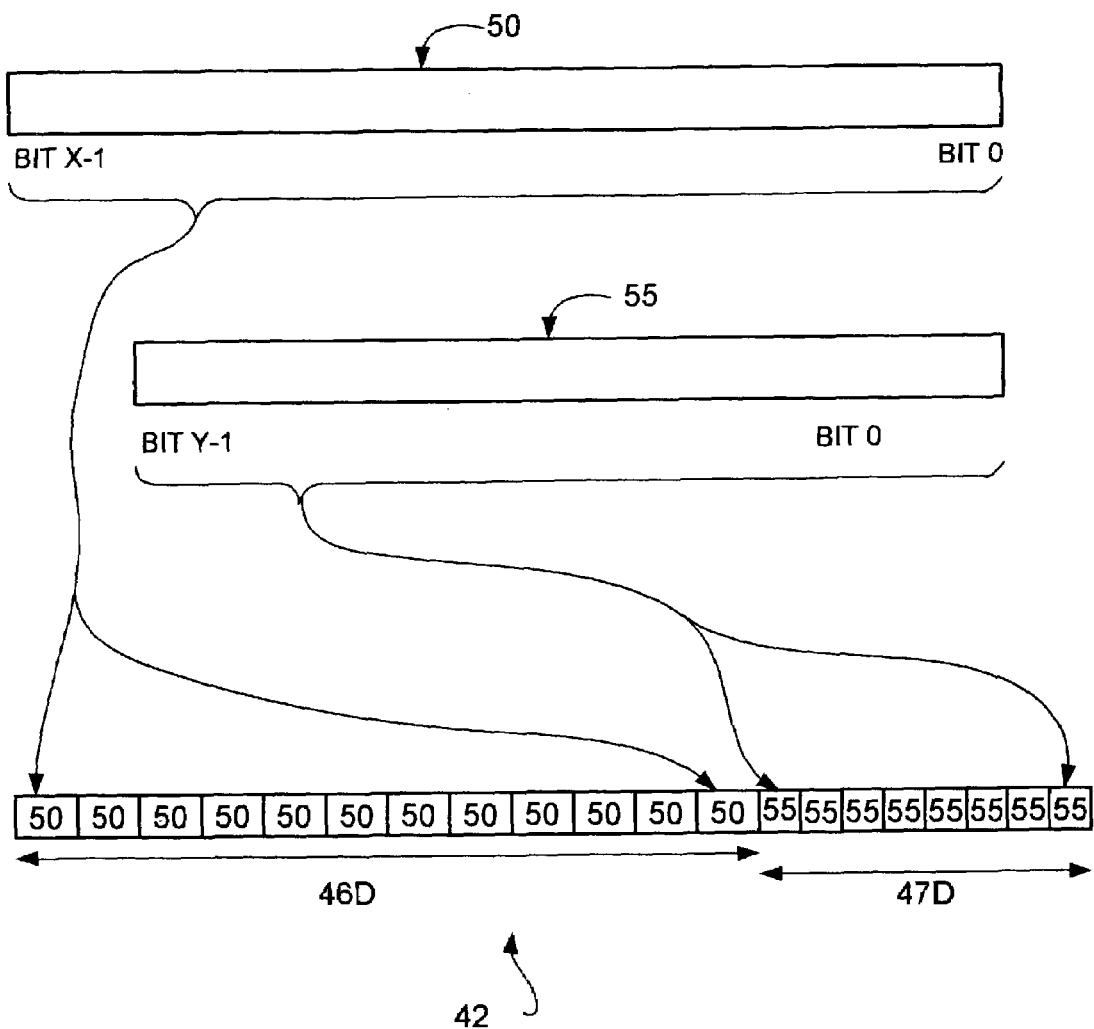
FIG. 5 shows a snoop directory entry and a remote cache directory entry, and an exemplary utilization of the directory memory to hold a number of snoop directory entries in a snoop directory partition and a number of remote memory directory entries in a remote memory directory partition.

Snoop directory entries do not have to be the same size (number of bits) as remote memory directory entries. FIG. 5 shows an exemplary snoop directory entry 50. Snoop directory entry 50 is shown as having "X" bits (i.e., bit 0 through bit X–1). An exemplary remote memory directory entry 55 is shown to have "Y" bits (i.e., bit 0 through bit Y–1. Directory memory 42 is shown to have a snoop directory partition 46D containing a number of instances of snoop directory entry 50, and a remote memory directory partition 47D containing a number of instances of remote memory directory entry 55. If the number of bytes of either partition, or the total number of bytes do not exactly match convenient addressing ranges in directory memory 42, a small amount of memory in directory memory 42 may not be used (not shown), as will be understood by those of skill in the art. Given enough design complexity, all—or almost all—of directory memory 42 can be used; considerations of design simplicity may drive a designer to leaving some portion of directory memory 42 unused, still within the spirit and scope of this invention.

Figure 6:
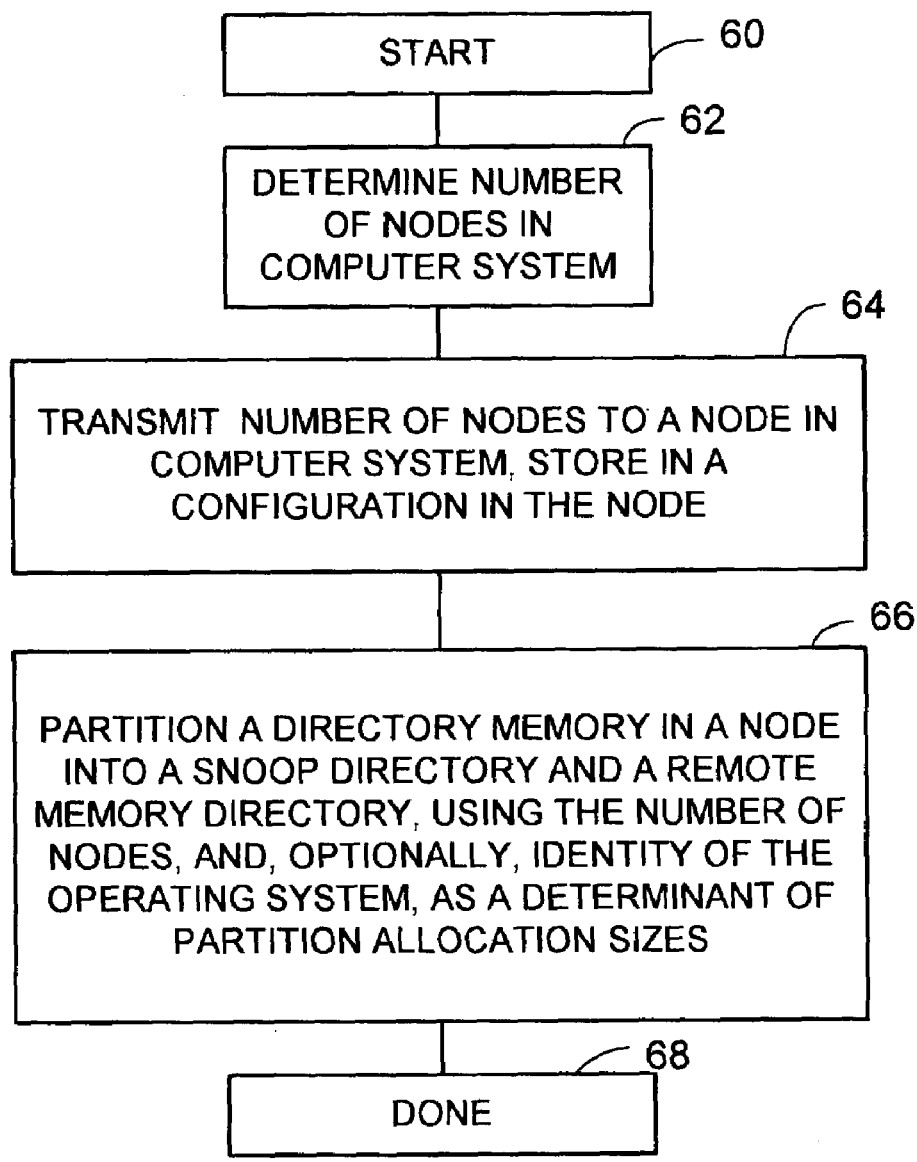
FIG. 6 shows a block diagram of a method illustrating a preferred embodiment of the invention.

FIG. 6 is a flow chart of a method embodiment of the present invention.

Step 60 begins the method and passes control to step 62.

In step 62, the number of nodes in a computer system is determined. As taught previously, this is done by a system manager. In some computer systems, the system manager actively queries the system to discover the number of nodes installed. In other computer systems, the number of nodes installed is stored in the system manager in a nonvolatile storage such as an EEPROM, a hard disk, or other such nonvolatile memory device.

In step 64, a node receives information about the number of nodes installed in the computer system, and the node stores the information in a configuration. The configuration is typically a volatile storage element, such as a number of latches, or a location in an SRAM (Static Random Access Memory).

In step 66, a directory memory in a node is partitioned, respondent to the information in the configuration about the number of nodes in the computer system as a determinant of partition allocation sizes. Identity of the operating system can be a further determinant of partition allocation sizes, as shown in Table 1. A first partition is provided for a snoop directory, and stores snoop directory entries. A snoop directory in a particular node contains snoop directory entries for cache lines used in the particular node, regardless of whether the cache lines are in a memory space of the particular node or were received from a different node. A second partition is provided for a remote memory directory. The remote memory directory contains directory entries for cache lines sent from the instant node to a different node, and where the addresses of the cache lines are in the address space of the instant node. If the computer system has only a single node, substantially all of the directory memory is allocated to the snoop directory, since no cache lines are sent to other nodes. The second partition (for the remote memory directory) has substantially no memory allocated to it, preferably no memory space at all. If the computer system has two nodes, the directory memory partitions are allocated to have a relatively small portion of the directory memory given to the remote memory directory, and a relatively large portion of the directory memory given to the snoop directory. As more nodes are installed in the computer system, the portion of directory memory allocated to the snoop directory partition is reduced in a predetermined manner, and the portion of the directory memory allocated to the remote memory directory partition is increased in a predetermined manner. The actual allocation of the directory memory as the number of nodes increases varies by type of system, and especially with the software used in the system, as described earlier.

Step 68 ends the method.

The method described above can be implemented as a program product. A program product is a set of computer instructions that, when executed on a suitable computer, causes the method to be followed. The program product can exist on and be distributed on media that can be read by and executed by a suitable computer. Such media include but are not limited to CDROM disks, floppy disks, hard disks, and magnetic tape.

While the foregoing is directed to embodiments of the present invention, other and further embodiments of the invention may be devised without departing from the basic scope thereof, and the scope thereof is determined by the claims that follow.

What is claimed is:

1. A method for allocating directory memory in a node of a computer system, the method comprising the steps of:
   determining how many nodes are in the computer system by reading a nonvolatile memory upon which the number of nodes in the system has been written;
   setting a configuration in a node with information indicative of the number of nodes in the computer system; and
   allocating a first partition of a directory memory in a node to a snoop directory, and a second partition of the directory memory in the node to a remote memory directory, respondent to the number of nodes determined to be in the computer system.

2. The method of claim 1, further comprising updating the configuration in a node when additional nodes are installed in the computer system.

3. The method of claim 1, in which the nonvolatile memory is chosen from the group consisting of EEPROMs, flash memories, hard disks, floppy disks, CDROMs, DVDs magnetic tapes, fuses, DIP switches, MRAMs, and FeRAMs.

4. The method of claim 1, further comprising the step of accessing a table having relative partition sizes for the snoop directory and the remote memory directory as a function of number of nodes determined to be in the computer system.

5. The method of claim 4, further comprising the step of accessing a table having relative partition sizes for the snoop directory and the remote memory directory as a function of an operating system.

6. A method for allocating directory memory in a node of a computer system, the method comprising the steps of:
   determining how many nodes are in the computer system; the step of determining how many nodes are in the computer system further comprising the steps of:
   coupling a signal conductor from a first node site to a second node site;
   coupling a weak pull element to a first voltage source and further coupling the weak pull element to the signal conductor, such that the weak pull element provides a first logic level on the signal conductor in the absence of a stronger pull element to a second voltage source;
   providing the stronger pull element to the second voltage source if a second node is installed at the second node site, the stronger pull element establishing a second logic level on the signal conductor;
   recognizing, by a first processor node, the logic level of the signal conductor; and determining from the logic level the presence or absence of a node at the second node site; and
   allocating a first partition of a directory memory in a node to a snoop directory, and a second partition of the directory memory in the node to a remote memory directory, respondent to the number of nodes determined to be in the computer system.

7. A method for allocating directory memory in a node of a computer system, the method comprising the steps of:
   determining how many nodes are in the computer system, the step of determining how many nodes are in the computer system further comprising the steps of:
   polling each node that may be in the computer system;
   receiving information from the polls confirming the existence or nonexistence of each node that may be in the computer system;
   accumulating the number of nodes existent in the computer system; and
   updating a configuration in a node with information indicative of the number of nodes in the computer system; and
   allocating a first partition of the directory memory in the node to a remote memory directory, and a second partition of the directory memory in the node to a remote memory directory, respondent to the number of nodes determined to be in the computer system.

8. A computer system comprising:
   one or more nodes, each node comprising more than one processor;
   a directory memory in at least one of the nodes that is allocated into a snoop directory partition and a remote memory directory partition, the number of nodes in the computer system being a determinant of the partition sizes; and a nonvolatile memory in a node in which the number of nodes in the computer system is stored;

wherein an increasingly larger portion of the directory memory in at least one of the nodes is allocated to the remote directory partition as more nodes are installed on the computer system.

9. The computer system of claim 8 in which the nonvolatile memory is chosen from the group consisting of EEPROMs, flash memories, hard disks, floppy disks, CDROMs, DVD's, magnetic tapes, fuses, DIP switches, MRAMs, and FeRAMs.

10. A computer system comprising:

one or more nodes, each node comprising more than one processor;

a directory memory in at least one of the nodes that is allocated into a snoop directory partition and a remote memory directory partition, the number of nodes in the computer system being a determinant of the partition sizes; and a system manager capable of determining the number of nodes in the computer system;

a memory controller in the at least one of the nodes, the memory controller coupled to the system manager and capable of receiving information from the system manager indicative of the number of nodes in the computer system, the memory controller capable of allocating the directory memory to the snoop directory partition and to the remote memory partition, respondent to the information indicative of the number of nodes in the computer system;

wherein an operating system is a determinant of the relative sizes of the snoop directory partition and the remote memory partition.

11. A program product comprising instructions that, when executed on a suitable computer system, having one or more nodes, causes the computer to execute the steps of:

determining the number of nodes installed on the computer system; and controlling allocation of a directory memory in a node, determinant, at least in part, by the number of nodes determined to be in the computer system, the allocation partitioning a portion of the directory memory to a snoop directory partition and the allocation further partitioning a portion of the directory memory to a remote memory directory;

wherein the step of controlling allocation of a directory memory in a node is further determined, at least in part, by an operating system being run on the computer system.

12. The program product of claim 11, wherein, for a particular number of nodes determined to be on the computer system, a larger partition is allocated to a remote memory directory for a first operating system than for a second operating system, the first operating system having a lower locality of reference than the second operating system.

* * * * *